United States Patent
Park

(10) Patent No.: US 11,027,649 B2
(45) Date of Patent: Jun. 8, 2021

(54) VEHICLE WITH CONTROLLER CONFIGURED TO ACQUIRE IMAGES TO DETERMINE A NUMBER OF BOARDING PASSENGERS, AND METHOD THEREFOR

(71) Applicants: HYUNDAI MOTOR COMPANY, Seoul (KR); KIA MOTORS CORPORATION, Seoul (KR)

(72) Inventor: SeYoung Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/560,800

(22) Filed: Sep. 4, 2019

(65) Prior Publication Data
US 2020/0189460 A1  Jun. 18, 2020

(30) Foreign Application Priority Data
Dec. 17, 2018 (KR) .......................... 10-2018-0162923

(51) Int. Cl.
| | |
|---|---|
| *B60Q 9/00* | (2006.01) |
| *B60R 11/04* | (2006.01) |
| *B60R 1/12* | (2006.01) |
| *B60R 1/074* | (2006.01) |
| *B60R 25/01* | (2013.01) |
| *B60R 25/31* | (2013.01) |
| *B60R 25/30* | (2013.01) |
| *B60R 11/00* | (2006.01) |
| *B60R 25/24* | (2013.01) |

(52) U.S. Cl.
CPC ............... *B60Q 9/00* (2013.01); *B60R 1/074* (2013.01); *B60R 1/12* (2013.01); *B60R 11/04* (2013.01); *B60R 25/01* (2013.01); *B60R 25/305* (2013.01); *B60R 25/31* (2013.01); *B60R 25/24* (2013.01); *B60R 2001/1253* (2013.01); *B60R 2011/004* (2013.01); *B60R 2011/0043* (2013.01)

(58) Field of Classification Search
CPC .. B60Q 9/00; B60R 1/00; B60R 1/074; B60R 1/12; B60R 11/04; B60R 16/0373; B60R 21/01516; B60R 21/01538; B60R 25/01; B60R 25/24; B60R 25/305; B60R 25/31; B60R 2001/1253; B60R 2011/004; B60R 2011/0043; B60W 30/06; B60W 50/08; B60W 50/14; E05F 15/73; G05D 1/0088; G05D 1/0246; G06K 9/00342; G06K 9/00832; G07C 9/00563; G08G 1/202
USPC ..................................................... 340/425.5
See application file for complete search history.

(56) References Cited

U.S. PATENT DOCUMENTS

| | | | | |
|---|---|---|---|---|
| 4,567,566 | A * | 1/1986 | Araya | G06F 15/56 364/554 |
| 10,043,396 | B2 * | 8/2018 | Salter | H04W 4/023 |
| 10,740,632 | B2 * | 8/2020 | Vachhani | G06Q 50/30 |

(Continued)

*Primary Examiner* — Stephen R Burgdorf
(74) *Attorney, Agent, or Firm* — Brinks Gilson & Lione

(57) ABSTRACT

A vehicle includes an image acquisition unit configured to acquire an image around the vehicle, and a controller configured to control the image acquisition unit to acquire an image of a predetermined area based on a positional relationship between a smart key and the vehicle, and an opening of at least one of rear doors of the vehicle, and determine the number of boarding passengers based on the image of the predetermined area.

12 Claims, 10 Drawing Sheets

(56) References Cited

U.S. PATENT DOCUMENTS

| | | | |
|---|---|---|---|
| 2007/0200668 A1* | 8/2007 | Kurpinski | B60R 25/24 340/5.64 |
| 2009/0057068 A1* | 3/2009 | Lin | B66B 1/468 187/392 |
| 2009/0238466 A1* | 9/2009 | Golan | G06K 9/522 382/199 |
| 2012/0217764 A1* | 8/2012 | Ishiguro | E05B 81/78 296/1.07 |
| 2017/0291792 A1* | 10/2017 | Scoville | B66B 1/3407 |
| 2018/0068510 A1* | 3/2018 | Atsumi | G07C 1/32 |
| 2018/0075565 A1* | 3/2018 | Myers | G06Q 30/02 |
| 2019/0023527 A1* | 1/2019 | Larmuseau | B66B 1/3461 |
| 2019/0056749 A1* | 2/2019 | Kim | H04N 5/23296 |

* cited by examiner

VEHICLE WITH CONTROLLER CONFIGURED TO ACQUIRE IMAGES TO DETERMINE A NUMBER OF BOARDING PASSENGERS, AND METHOD THEREFOR

CROSS-REFERENCE TO RELATED APPLICATION(S)

This application claims priority from Korean Patent Application No. 10-2018-0162923, filed on Dec. 17, 2018 in the Korean Intellectual Property Office, the disclosure of which is incorporated herein by reference in its entirety.

BACKGROUND

1. Technical Field

The present disclosure relates to a vehicle and a control method thereof for detecting passengers who board the vehicle.

2. Description of the Related Art

Recently, accidents involving leaving infants in a rear seat of a vehicle due to a driver's carelessness have frequently occurred. In order to prevent such accidents, various technologies have been developed and used for checking if people are staying in the vehicle. However, the current technologies cannot precisely check whether people are aboard the vehicle.

The disclosure of this section is to provide background of the invention. Applicant notes that this section may contain information available before this application. However, by providing this section, Applicant does not admit that any information contained in this section constitutes prior art.

SUMMARY

Aspects of the invention provide a vehicle and a control method thereof capable of processing an image obtained by a camera provided in the vehicle to determine whether or not passengers of a rear seat are boarding or exiting the vehicle, and to inform a driver of the determined information. Further, aspects of the invention provide a vehicle and a control method thereof for detecting passengers who board the vehicle to a rear seat or who exit the vehicle from the rear seat by using a camera.

Additional aspects of the embodiments will be set forth in part in the description which follows and, in part, will be obvious from the description, or may be learned by practice of the embodiments.

According to an aspect of an embodiment, there is provided a vehicle including an image acquisition unit configured to acquire an image around the vehicle, and a controller configured to control the image acquisition unit to acquire an image of a predetermined area based on a positional relationship between a smart key and the vehicle, and an opening of at least one of rear doors of the vehicle, and determine the number of boarding passengers based on the image of the predetermined area.

The controller may determine the number of passengers included in the image of the predetermined area when at least one of the rear doors of the vehicle is opened.

The controller may determine the number of non-boarding passengers included in the image of the predetermined area when the rear doors are closed after the opening of the at least one of the rear doors.

The controller may determine the number of the boarding passengers based on a difference between the number of the passengers and the number of the non-boarding passengers.

The vehicle may further include an output device, wherein the controller may output a confirmation message of whether the boarding passenger exits the vehicle to the output device when an engine of the vehicle is turned off.

The controller may determine the number of exiting passengers who leave from the predetermined area, and output a remaining passenger message to the output device based on a difference between the number of the boarding passengers and the number of the exiting passengers when at least one of the rear doors of the vehicle is open after the acquiring of the image of the predetermined area.

The image acquisition unit may be disposed on a side view mirror.

The controller may fold the side view mirror corresponding to at least one of front doors based on an opening of the at least one of the front doors of the vehicle.

The controller may unfold the side view mirror based on the positional relationship between the smart key and the vehicle before the opening of the front doors to start to acquire the image of the predetermined area.

The controller may determine the number of the boarding passengers as the final number of the boarding passengers when a speed of the vehicle exceeds a predetermined speed.

The controller may update the number of the boarding passengers based on the image of the predetermined area acquired by the image acquisition unit when the additional number of the boarding passengers is determined before an engine of the vehicle is turned off.

According to an aspect of another embodiment, there is provided a vehicle control method including acquiring, by an image acquisition unit, an image of a predetermined area based on a positional relationship between a smart key and a vehicle, and an opening of at least one of rear doors of the vehicle, and determining the number of boarding passengers based on the image of the predetermined area.

The determining of the number of the boarding passengers based on the image of the predetermined area may include determining the number of passengers included in the image of the predetermined area when at least one of the rear doors of the vehicle is open.

The determining of the number of the boarding passengers based on the image of the predetermined area may include determining the number of non-boarding passengers included in the image of the predetermined area when the rear doors are closed after the opening of the at least one of the rear doors.

The determining of the number of the boarding passengers based on the image of the predetermined area may include determining the number of the boarding passengers based on a difference between the number of the passengers and the number of the non-boarding passengers.

The vehicle control method may further include outputting a confirmation message of whether the boarding passenger exits the vehicle when an engine of the vehicle is turned off.

The vehicle control method may further include when at least one of the rear doors of the vehicle is open after the acquiring of the image of the predetermined area, determining the number of exiting passengers who leave from the predetermined area, and outputting a remaining passenger message to the output device based on a difference between the number of the boarding passengers and the number of the exiting passengers.

The acquiring, by an image acquisition unit, of the image of the predetermined area may include starting to acquire the image of the predetermined area by unfolding a side view mirror based on the positional relationship between the smart key and the vehicle before the opening of the front doors.

The determining of the number of the boarding passengers based on the image of the predetermined area may include determining the number of the boarding passengers as the final number of the boarding passengers when a speed of the vehicle exceeds a predetermined speed.

The vehicle control method may further include updating the number of the boarding passengers based on the image of the predetermined area acquired by the image acquisition unit when the additional number of the boarding passengers is determined before an engine of the vehicle is turned off.

BRIEF DESCRIPTION OF THE DRAWINGS

These above and/or other aspects of the disclosure will become apparent and more readily appreciated from the following description of embodiments, taken in conjunction with the accompanying drawings in which.

DETAILED DESCRIPTION

Figure 1:
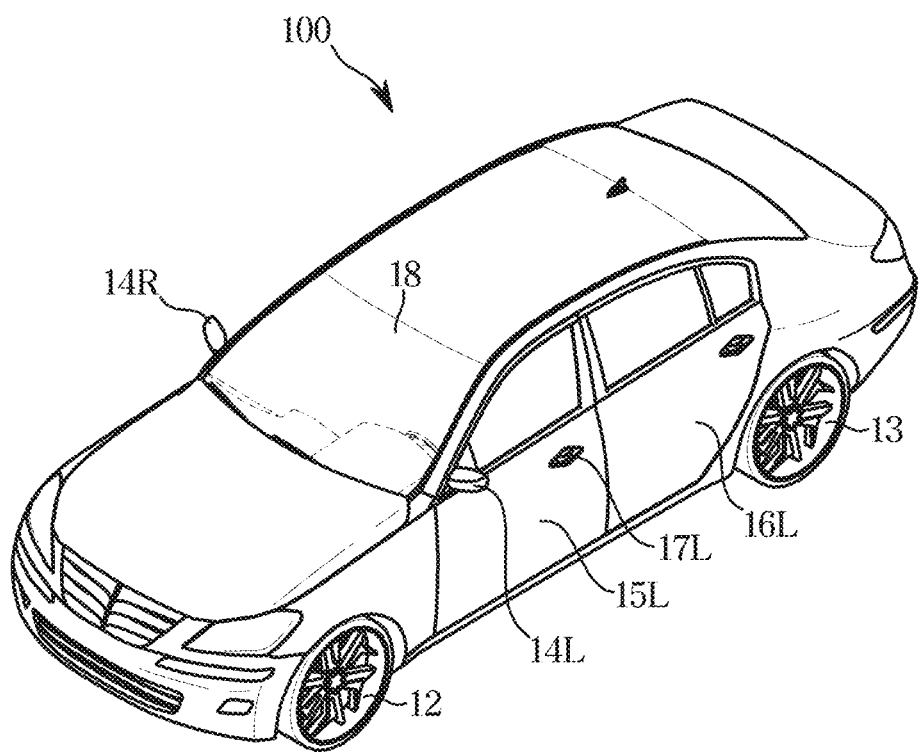
FIG. 1 is an external view of a vehicle according to an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting. As used herein, the singular forms "a," "an," and "the" are intended to include the plural forms as well, unless the context clearly indicates otherwise.

Reference will now be made in detail to the embodiments of the present disclosure, examples of which are illustrated in the accompanying drawings, wherein like reference numerals refer to like elements throughout.

In some implementations for preventing baby from being left in a car, when the rear door is opened and closed before the vehicle is started or while an engine is running, a warning message is output at the time of turning off the engine after driving. However, the number of passengers in the rear seat cannot be precisely confirmed.

For that reason, an implementation may provide a technique of confirming the number of passengers in the rear seat using an ultrasonic sensor. However, due to the characteristics of the ultrasonic sensor, it may be difficult to detect the passengers when the movement inside the vehicle is too small. Also, when the ultrasonic sensor is used, the detection performance may vary depending on the surroundings of an ultrasonic wave emission path such as a seat position and the opening of windows.

Figure 2:
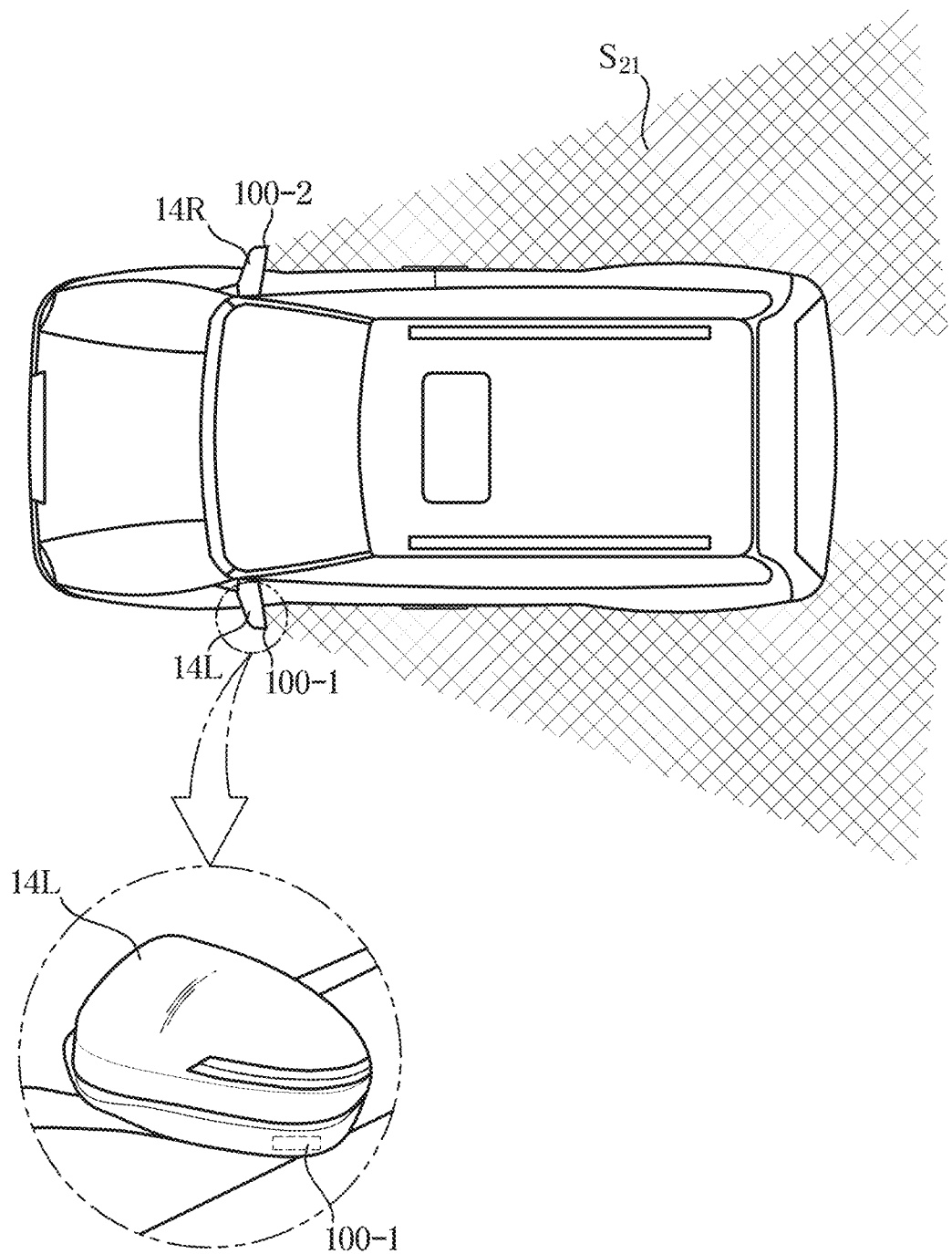
FIG. 2 is a schematic view illustrating an image acquisition unit disposed on a vehicle according to an embodiment of the present disclosure.

FIG. 1 is an external view of a vehicle according to an embodiment of the present disclosure, and FIG. 2 is a schematic view illustrating an image acquisition unit disposed on a vehicle according to an embodiment of the present disclosure.

Referring to FIG. 1, in embodiments, a vehicle 1 according to an embodiment of the present disclosure includes wheels 12 and 13 for moving the vehicle 1, a front door 15L for shielding the interior of the vehicle 1 from the outside, a front glass 18 for providing an inside user with a view of the front of the vehicle 1 and side view mirrors 14L and 14R for providing the user with a view of the rear of the vehicle 1.

The wheels 12 and 13 include the front wheel 12 provided at the front of the vehicle and the rear wheel 13 provided at the rear of the vehicle. A driving device provided inside the vehicle 1 provides a rotational force to the front wheel 12 or the rear wheel 13 so that the vehicle 1 moves forward or backward. Such driving device may include an engine that generates a rotational force by burning fossil fuel, or a motor that generates power by receiving power from a capacitor.

The front door 15L, front door 15R and rear doors 16L and 16R are rotatably provided on the left and right sides of the vehicle 1 so that the driver or passengers can board inside the vehicle 1 when opened, and shield the interior of the vehicle 1 from the outside when closed. Also, a grip 17L capable of opening and closing the front doors 15L and 15R can be provided outside the vehicle 1, and an LF (Low Frequency) antenna capable of transmitting an LF signal can be mounted.

The front glass 18 is provided on the front upper side of the main body so that the driver inside the vehicle 1 can obtain visual information in front of the vehicle 1 and is also called a windshield glass.

In embodiments, the side view mirrors 14L and 14R include the left side view mirror 14L provided on the left side of the vehicle 1 and the right side view mirror 14R provided on the right side of the vehicle 1 so that the driver inside the vehicle 1 can obtain visual information of the sides and the rear of the vehicle 1.

In addition, the vehicle 1 may include a sensing device such as proximity sensors for detecting rear or side obstacles or other vehicles, and a rain sensor for detecting rainfall and precipitation.

Referring to FIG. 2, a range S21 around the vehicle acquired by the image acquisition unit is described. Image acquisition units 100-1 and 100-2 are provided in the side view mirrors 14L and 14R of the vehicle and can acquire images on the left side and right side ranges of the vehicle 1. The cameras included in the image acquisition units 100-1 and 100-2 may be provided in a part of the side view mirrors 14L and 14R of the vehicle. The position of the camera is not limited if it is a position where the left or right side image of the vehicle 1 can be acquired.

Figure 3:
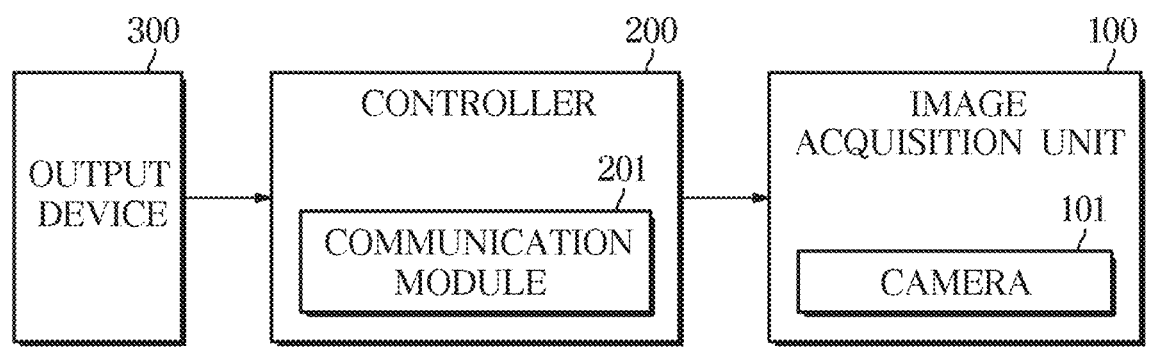
FIG. 3 is a control configuration diagram of a vehicle according to an embodiment of the present disclosure.

FIG. 3 is a control configuration diagram of a vehicle according to an embodiment of the present disclosure.

Referring to FIG. 3, the vehicle 1 according to an embodiment may include an output device 300, a controller 200, and an image acquisition unit 100.

The image acquisition unit 100 can acquire one or more images around the vehicle 1. The image acquisition unit 100 may include a camera 101.

The camera 101 may acquire the side image of the vehicle 1 and transmit the acquired image to the controller 200. According to one embodiment, the camera 101 may be provided in the side view mirrors 14L and 14R provided in the vehicle 1 to acquire images around the vehicle 1.

The camera 101 provided in the vehicle 1 may include the CCD (Charge-Coupled Device) camera or a CMOS color image sensor. Here, both the CCD and the CMOS refer to a sensor that converts light received through the lens of the camera into an electric signal. Specifically, the CCD (Charge-Coupled Device) camera 101 is a device that converts an image into an electric signal using a charge-coupled device. In addition, CIS (CMOS Image Sensor) includes a low-power, low-power type of imaging device having a CMOS structure and serves as an electronic film of a digital device. Generally, the CCD is more sensitive than the CIS and is widely used in the vehicle 1, but the present invention is not limited thereto. The invention is not limited to a specific position of the camera or a specific structure of the camera 101, if the camera 101 can acquire an image including the passenger in vicinity of the vehicle 1.

The controller 200 controls the image acquisition unit 100 to acquire the one of more images of the predetermined area based on the positional relationship between a smart key 400 and the vehicle 1 and an opening of at least one of the rear doors of the vehicle 1.

The controller 200 may include a communication module 201 for communicating with the smart key 400 and the image acquisition unit 100.

The communication module 201 may include one or more components that enable communication with an external device, for example, the communication module 201 may include at least one of a short-range communication module, a wired communication module, and a wireless communication module.

The short-range communication module may include various short-range communication modules that transmit and receive signals using a wireless communication network in a short distance such as a Bluetooth module, an infrared communication module, an RFID (Radio Frequency Identification) communication module, a WLAN (Wireless Local Access Network) communication module, an NFC communication module, a Zigbee communication module, etc.

The wired communication module may include not only wired communication modules such as a CAN (Controller Area Network) communication module, a Local Area Network (LAN) module, a Wide Area Network (WAN) module, or a Value Added Network (VAN) module, but also various cable communication modules such as USB (Universal Serial Bus), HDMI (High Definition Multimedia Interface), DVI (Digital Visual Interface), RS-232 (recommended standard 232), power line communication, or Plain Old Telephone Service (POTS).

The wireless communication module may include not only a WIFI module and a Wireless broadband module, but also wireless communication modules supporting various wireless communication methods such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), etc.

In embodiments, the smart key 400 can be connected to the vehicle 1 through transmitting and receiving of wired or wireless signals. The smart key 400 may be provided as a FOB key for wired or wireless connection to the vehicle 1 to unlock a door lock, or to start and drive the vehicle 1. The smart key 400 and the vehicle 1 can transmit and receive signals through an LF communication network and an RF communication network.

The LF communication network is a low-frequency communication network used by the vehicle 1 to transmit an LF signal for scanning the smart key 400, for example, it may be a communication network having a frequency band of 20 kHz to 135 kHz. When the LF signal is transmitted or received through the LF communication network, the transmitting or receiving distance of the signal is shorter than the transmitting or receiving distance of the RF communication network having the high frequency band because of the characteristics due to the low frequency band. For example, the transmitting and receiving distance of the LF signal is about 12 m, and the transmitting and receiving distance of the RF signal is about 100 m. Therefore, the vehicle 1 can scan the smart key 400 close to the vehicle 1 by transmitting the LF signal through the LF communication network.

The RF communication network is a communication network of a high frequency band for receiving the RF signal from the smart key 400 from which the vehicle 1 has received the LF signal. For example, it may be a communication network having a frequency band of 315 MHz or more and 433 MHz or less. When an RF signal is transmitted and received through an RF communication network, a signal transmitting or receiving distance is longer than a signal transmitting or receiving distance of LF communication network which have a low frequency band.

The LF signal includes a scanning signal for searching for the smart key 400 around the vehicle 1 (for example, within the transmitting/receiving distance of the LF signal). The RF signal includes a scanning response signal that the smart key 400 generates as a signal in response to the scanning signal. Based on the above-described operation and configuration of the smart key 400, the controller 200 may determine whether the driver holds the smart key 400 and approaches the vehicle 1 within a predetermined distance, or if the driver inputs an operation such as unlocking the vehicle 1. Based on the above described operation, the controller 200 may determine the driver's intention to drive the vehicle 1. Detailed operations related to this will be described later.

The controller 200 may include an Image Signal Processor (ISP) for processing the one or more images acquired by the image acquiring unit, a Digital Signal Processor (DSP) for converting and processing the processed image into a digital signal, a configuration for storing data processed by the DSP and an Amplifier (AMP) for amplifying the processed image.

The ISP refers to a semiconductor chip that performs luminance or color processing on an image transmitted from the camera 101. In addition, the ISP can additionally support functions such as focus, reverse, mosaic, DIS, and video format.

The DSP refers to a chip that processes digital signals. For example, the DSP in the controller 200 is a type of processor that conducts all-round controls of the controller 200. The DSP controls the ISP, and when the ISP is off, the DSP digitally processes the image transmitted from the camera 101 and outputs the image to be displayed on a display.

The AMP amplifies the image processed by the DSP and transmits the amplified image to the display. The AMP may be an amplifying device installed in the module for performing general image processing, and there is no limitation.

The controller 200 may determine the number of passengers included in the image of the predetermined area when at least one of the rear doors 16L and 16R of the vehicle 1 is open. Also, the controller 200 may determine the number of non-boarding passengers included in the image of the predetermined area when the rear doors 16L and 16R are closed after the opening of the at least one of the rear doors 16L and 16R. The controller 200 may determine the number of the boarding passengers and the non-boarding passengers by processing the image acquired by the image acquisition unit 100. Meanwhile, the controller 200 may determine the number of the boarding passengers based on a difference between the number of the passengers and the number of the non-boarding passengers.

In one embodiment, the controller may determine the number of passengers by processing one image of the predetermined area. In another embodiment, the controller may determine the number of passengers by processing multiple images of the predetermined area. In a further embodiment, the controller may determine the number of passengers by processing multiple images of multiple predetermined areas.

The controller 200 may output a confirmation message of whether the boarding passenger exits the vehicle to the output device 300 when the engine of the vehicle is turned off. The form of confirmation message is not limited if it is intended to confirm whether or not the boarding passengers are in the vehicle 1.

The controller 200 may determine the number of exiting passengers who leave from the predetermined area, and output a remaining passenger message to the output device 300 based on a difference between the number of the boarding passengers and the number of the exiting passengers when at least one of the rear doors of the vehicle is open after the acquiring of the image of the predetermined area.

The time of the acquiring of the image of the predetermined area is defined as the time at which the image acquisition unit 100 starts to acquire the image of the predetermined area.

Specifically, in embodiments, the exiting passengers are the passengers who exit the vehicle 1 in a predetermined area centered on the vehicle 1, and this operation can be determined as exiting the vehicle 1, therefore, the controller 200 may determine the number of remaining passengers in vehicle 1 based on the difference between the number of the boarding passengers and the number of the exiting passengers.

Also, the controller 200 may output a remaining passenger message so that the driver can confirm the remaining passenger.

The above-described remaining passenger message may be output to the output device 300. The form of the remaining passenger message output to the output device 300 can be visually output to the display provided in the vehicle 1 such as a cluster or an AVN, can be output in a sound form through a speaker provided in the vehicle 1, and can be output in a light form through a lamp, an external buzzer, a mixer, and the like. But, the form of the output is not limited.

The controller 200 may fold the side view mirrors 14L and 14R corresponding to at least one of the front doors 15L and 15R based on an opening of the at least one of the front doors 15L and 15R of the vehicle 1. The image acquisition unit 100 may be disposed on the side view mirrors 14L and 14R disposed on the front doors 15L and 15R. When the front doors 15L and 15R are open, the viewing angle of the camera 101 included in the image acquisition unit 100 may be changed. Thus, in response to the opening of the front doors 15L and 15R, the controller 200 may control the image acquisition unit 100 to continuously acquire the image of the predetermined area Also, when a speed of the vehicle 1 exceeds a predetermined speed, the controller 200 may determine that there is no willingness for passengers to board or exit the vehicle 1, and may determine the number of the boarding passengers as the final number of the boarding passengers However, the controller 200 may update the number of the boarding passengers based on the image of the predetermined area acquired by the image acquisition unit 100 when the additional number of the boarding passengers is determined before the engine of the vehicle is turned off.

The determined final number of the boarding passengers can be used as a reference number of the passengers to determine the number of the exiting passengers when the vehicle 1 is pulled over and the rear doors 16L and 16R are open.

The controller 200 may include a memory that stores an algorithm for controlling the operation of components in the vehicle 1 or a program that implement an algorithm, and a processor that performs the above-described operation by using data stored in the memory. The memory and the processor may be implemented as separate chips. Alternatively, the memory and the processor may be implemented on a single chip.

At least one component may be added or deleted corresponding to the performance of the components of the vehicle 1 shown in FIG. 3. It will be readily understood by those skilled in the art that the mutual position of the components can be changed corresponding to the performance or structure of the system.

Meanwhile, each of the components shown in FIG. 3 refers to hardware components such as software and/or a Field Programmable Gate Array (FPGA) and an Application Specific Integrated Circuit (ASIC).

Figure 4:
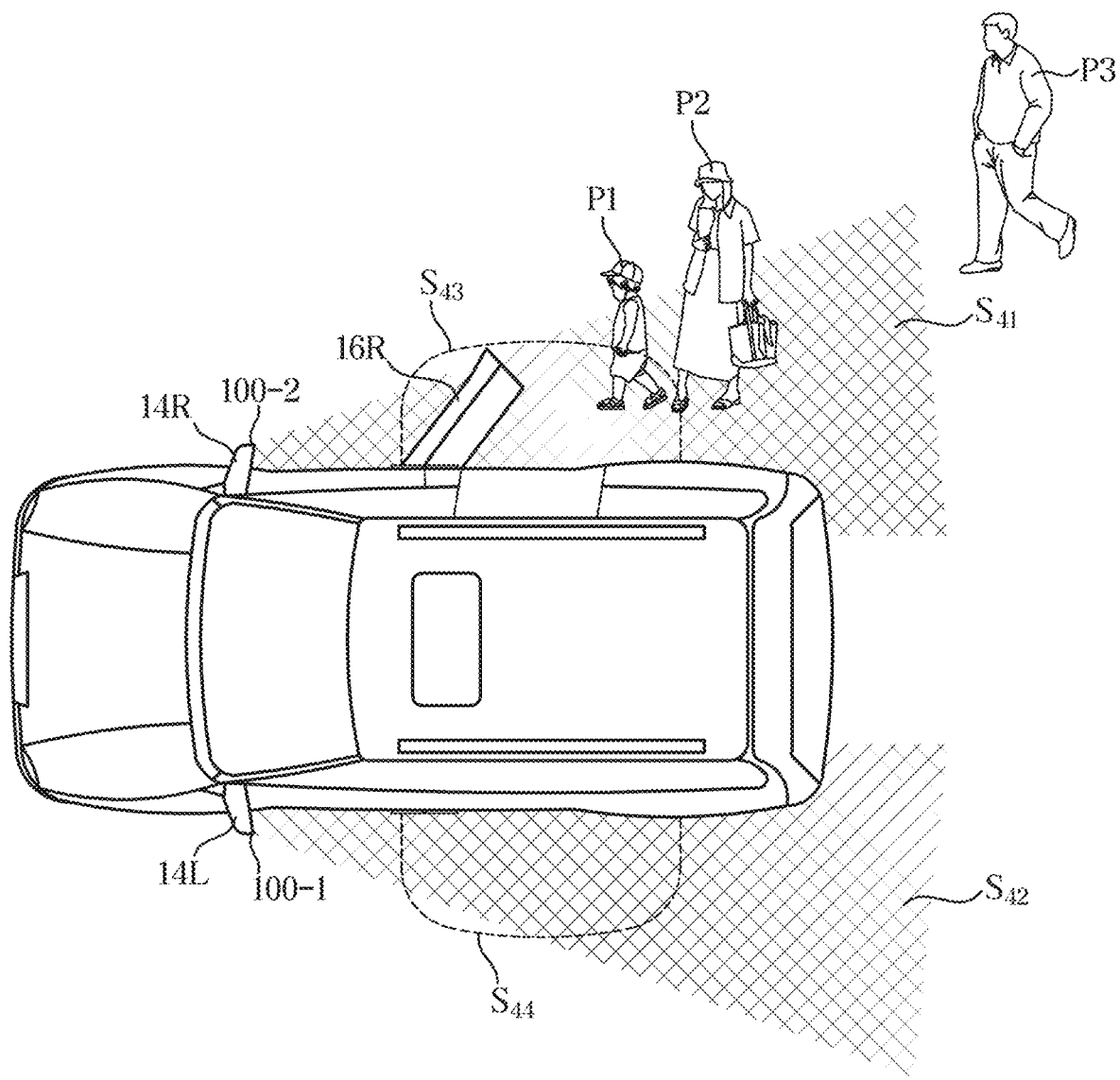
FIG. 4 is a schematic view illustrating a vehicle acquiring an image to determine the number of boarding passengers according to an embodiment of the present disclosure.

FIG. 4 is a schematic view illustrating a vehicle acquiring one or more images to determine the number of boarding passengers according to an embodiment of the present disclosure.

Referring to FIG. 4, the vehicle image acquisition units 100-1 and 100-2 can acquire images of side areas S41 and S42 of the vehicle. Further, the controller 200 may distinguish the area S41 on the side of the vehicle from a predetermined area S43. The predetermined area S43 can be determined as an area necessary for the passengers to board onto the rear seat of the vehicle 1. For example, although the image acquired by the image acquisition unit 100 may be the image of the area S41 on the side of the vehicle, the controller 200 may distinguish the area S41 on the side of the vehicle 1 from the predetermined area S43 related to the passenger's boarding.

According to one embodiment, passengers P1 and P2 included in the predetermined area S43 when the vehicle 1 is pulled over may be the basis for the controller 200 to determine the final number of the passengers as a preliminary number of the passengers in the vehicle 1.

Figure 5:
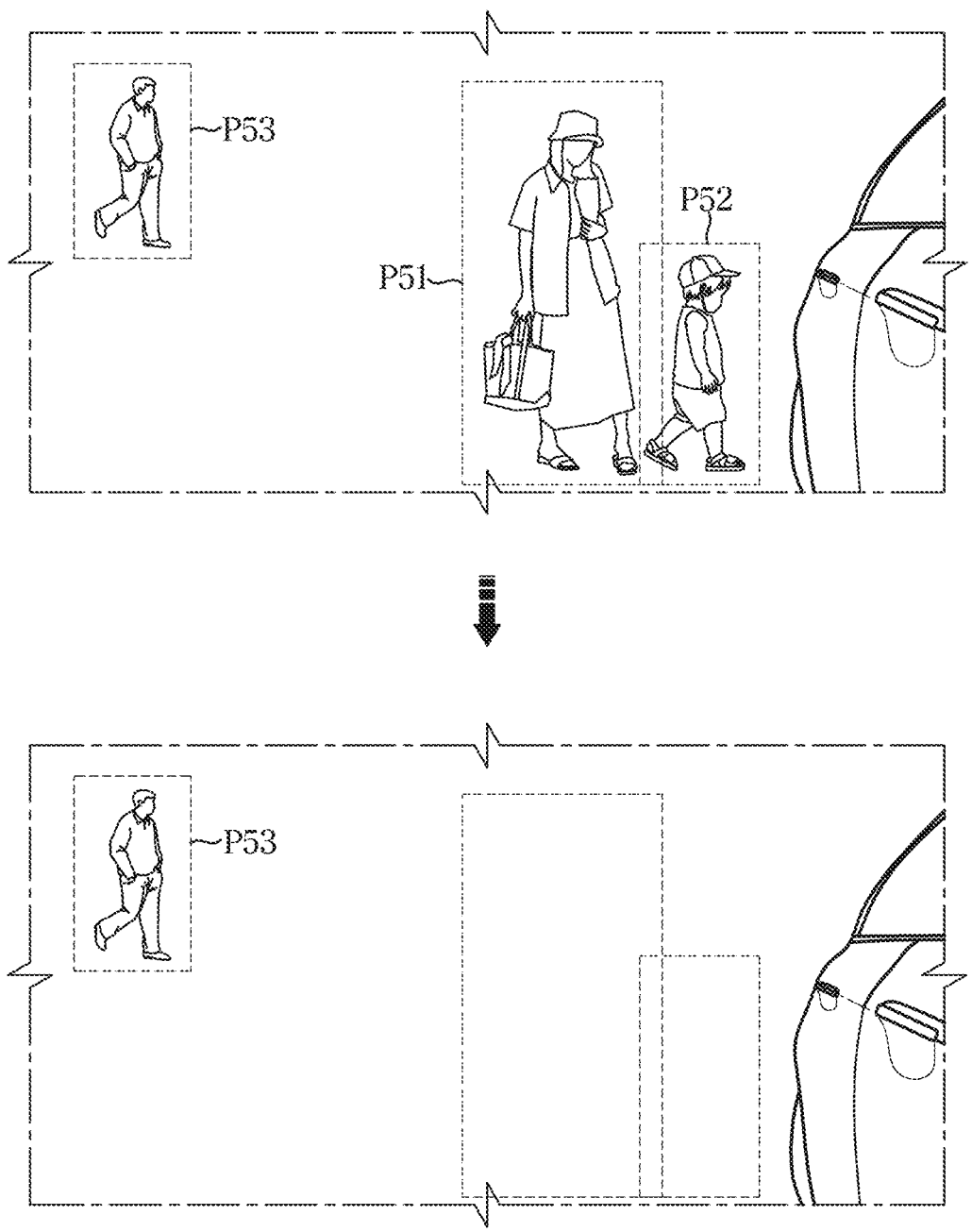
FIG. 5 is a schematic view illustrating a vehicle determining the number of boarding passengers according to an embodiment of the present disclosure.

FIG. 5 is a schematic view illustrating a vehicle determining the number of boarding passengers according to an embodiment of the present disclosure.

Referring to FIG. 5, when the driver holds the smart key 400 and approaches the vehicle 1 within a predetermined distance, or unlocks the vehicle 1 to drive the vehicle, the image acquisition unit 100 may acquire the image of the side of the vehicle 1. In this case, the vehicle 1 may acquire the image of the side of the vehicle 1 as described above, and may determine the number of passengers (P51, P52, P53) included in the image. In addition, the controller 200 may also determine whether the passengers included in the image is included in a predetermined area. In FIG. 5, the controller 200 may determine that the passengers P51 and P52 close to the vehicle are included in the predetermined area. As described above, the predetermined area is located when the passengers are willing to board. For example, the passenger P51 and the passenger P52 are determined as passengers willing to board, and the passenger P53 may simply be determined as a pedestrian passing behind the rear of the vehicle 1.

Meanwhile, when the rear doors 16L and 16R of the vehicle 1 are opened, the passengers are willing to board, and the controller may determine the number of the passengers P51 and P52 that were in the predetermined area. According to an embodiment, three of the passengers P51, P52, and P53 are included in the side image of the vehicle, but the controller 200 may determine that the passengers P51 and P52 included in the predetermined area are two passengers.

Thereafter, when the passengers close the rear doors 16L and 16R of the vehicle 1, the controller may determine the number of the passengers in the predetermined area after the after the rear doors 16L and 16R are closed.

In FIG. 5, the controller 200 may determine that the number of the non-boarding passengers is zero after the two passengers P51 and P52 are all boarded and the rear doors 16L and 16R are closed. Since the number of the passengers included in the predetermined area is two when the rear doors 16L and 16R are opened and the number of the non-boarding passengers included in the predetermined area is zero when the rear doors 16L and 16R are closed, the controller 200 may determine that the number of the boarding passengers is two. Further, the controller 200 may repeat the above operation under the camera detecting activation condition to detect the boarding passengers.

Figure 6:
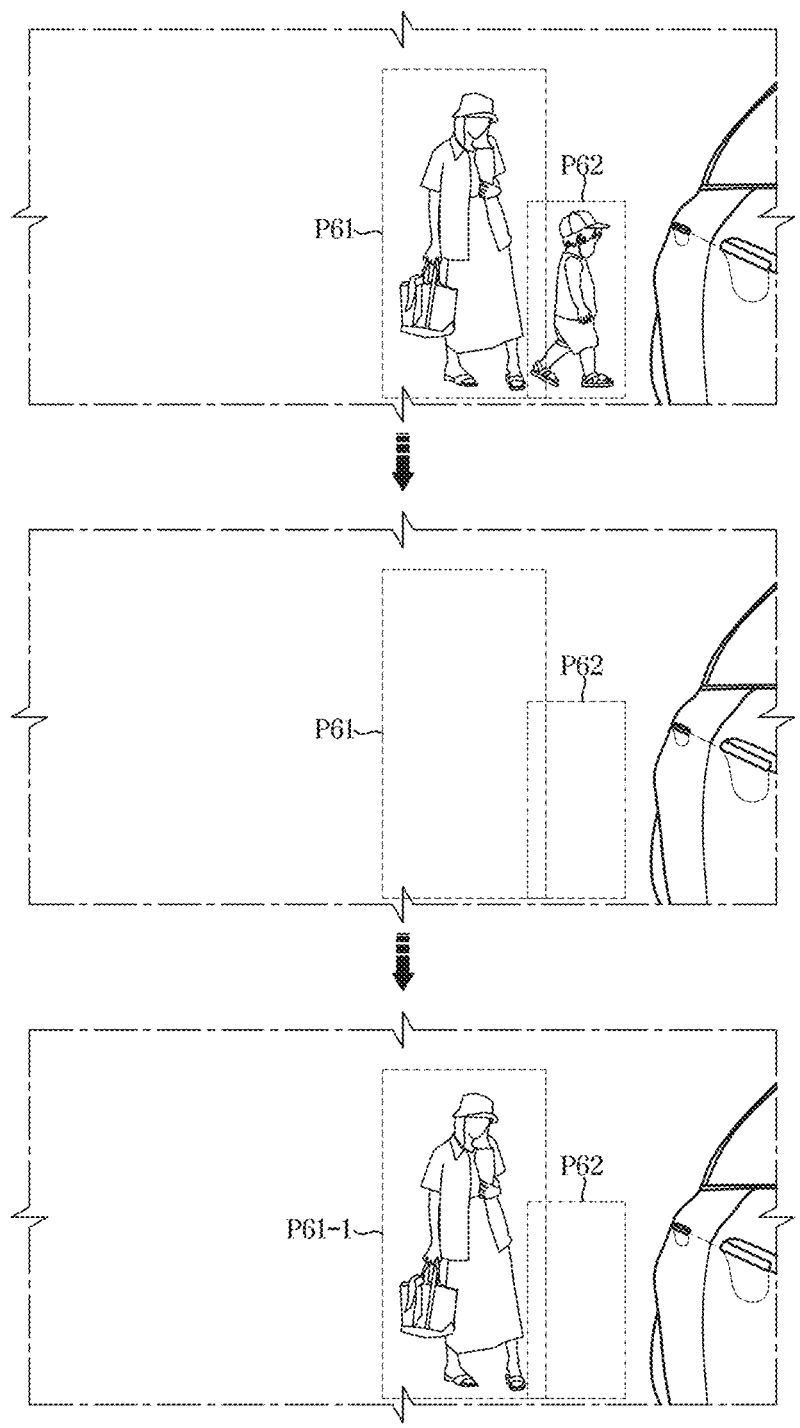
FIG. 6 is a schematic view illustrating a vehicle determining the number of remaining passengers according to an embodiment of the present disclosure.

FIG. 6 is a schematic view illustrating a vehicle determining the number of remaining passengers according to an embodiment of the present disclosure.

Referring to FIG. 6, as described in FIG. 5, the controller 200 may determine the number of the passengers included in an image of a predetermined area when at least one of the rear doors 16L and 16R is opened, and may determine the number of the non-boarding passengers included in the image of the predetermined area when the rear doors 16L and 16R are closed after the opening of the rear doors 16L and 16R, to determine a final number of the boarding passengers. In FIG. 6, in embodiments, since the number of passengers P61 and P62 included in the predetermined area is two when at least one of the rear doors 16L and 16R is opened, and the number of the non-boarding passengers is zero when the rear doors 16L and 16R are closed, the controller 200 may determine that the number of the boarding passengers is two.

Meanwhile, the controller 200 may determine the number of the exiting passengers who leave from the predetermined area when at least one of the rear doors 16L and 16R is opened after the engine of the vehicle 1 is turned off for the vehicle 1 to be pulled over. Specifically, FIG. 6 shows that a passenger appears in a predetermined area at a predetermined point in time after the engine of the vehicle 1 is turned off. In some instances, the controller 200 may determine the number of passengers P61-1 included in a predetermined area after the engine of the vehicle 1 is turned off is one even if the number of the boarding passengers P61 and P62 is two. If the passenger P61-1 leaves from the predetermined area later, the controller 200 may determine that the number of the exiting passengers is one. The controller 200 may continuously repeat the operation of detecting the exiting passenger with the image acquired by the image acquisition unit 100 until the engine of the vehicle 1 is turned off and all the doors of the vehicle 1 are locked.

The controller 200 may output a remaining passenger message to the output device 300 based on a difference between the number of the boarding passengers and the number of the exiting passengers. The controller 200 may output a guide signal through the output device 300 to guide the driver to confirm whether or not the boarding passengers are exiting the vehicle 1 when the engine of the vehicle 1 is turned off. The controller 200 may also output a remaining passenger message to the output device 300 based on a difference between the number of the boarding passengers and the number of the exiting passengers.

Meanwhile, the operations described in FIG. 5 and FIG. 6 are only examples of the present invention, and the invention is not limited thereto. According to embodiments illustrated in FIG. 5 and FIG. 6, the controller 200 is capable of determining the number of the boarding passengers and determining the exiting passengers based on the opening and closing of the vehicle doors.

Figure 7:
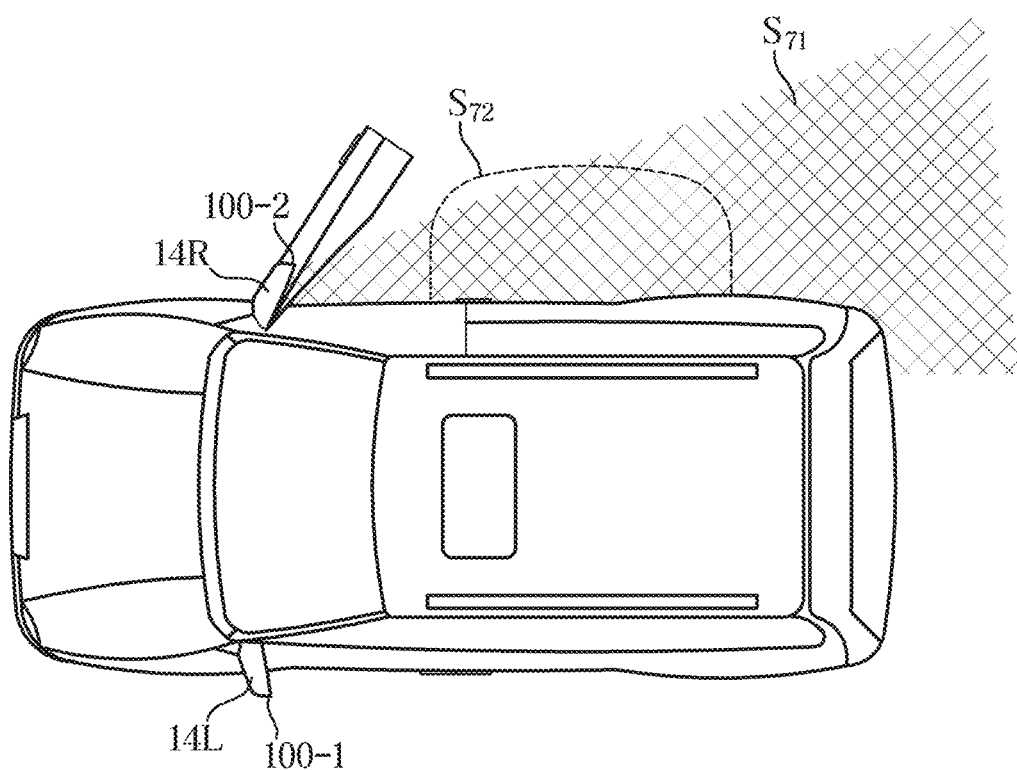
FIG. 7 is a schematic view illustrating a vehicle folding a side view mirror according to an embodiment of the present disclosure.

FIG. 7 is a schematic view illustrating a vehicle folding a side view mirror according to an embodiment of the present disclosure.

Referring to FIG. 7, when the front doors of the vehicle 1 are closed, the image acquisition unit 100-1 can acquire an image of a side view of the vehicle. When the front door of the vehicle 1 is opened, the angle of the right side view mirror 14R provided with the image acquisition unit 100-2 may not be suitable for acquiring an image of a predetermined area. A predetermined area S72 relating to the boarding of the vehicle 1 is an area which is brought into close contact with the side surface of the vehicle 1 to the rear side of the vehicle 1. Since the angle of the right side view mirror 14R of the vehicle 1 changes as the front door of the vehicle is opened, the controller 200 may control the right side view mirror 14R to be folded based on the opening of the front door of the vehicle 1.

Also, the image acquisition unit 100 may start to acquire the image of the predetermined area by unfolding the side view mirrors 14L and 14R based on the positional relationship between the smart key 400 and the vehicle 1 before the opening of the front doors.

Specifically, the side view mirrors 14L and 14R of the vehicle 1 may be folded before the start of the vehicle 1. When the smart key 400 approaches the vehicle 1, the side view mirrors 14L and 14R may be released from the folding state to start image acquisition in a predetermined area.

In embodiments, the camera provided in the unfolded side view mirrors 14L and 14R can acquire an image of a predetermined area before the opening of the front doors. The controller 200 may acquire images of a predetermined area irrespective of whether the front door is opened or not based on the operation described above, and may determine the number of the boarding passengers and the number of the remaining passengers based on the acquired images.

Meanwhile, the controller 200 may change the angle of the side view mirrors 14L and 14R continuously based on the degree of opening of the front doors, or may classify the state of the front doors into an open state and closed state to change the side view mirrors 14L and 14R to be folded. If the image acquisition unit 100 can acquire the image of the predetermined area, the invention is not limited to a specific operation of folding the side view mirrors 14L and 14R.

Figure 8:
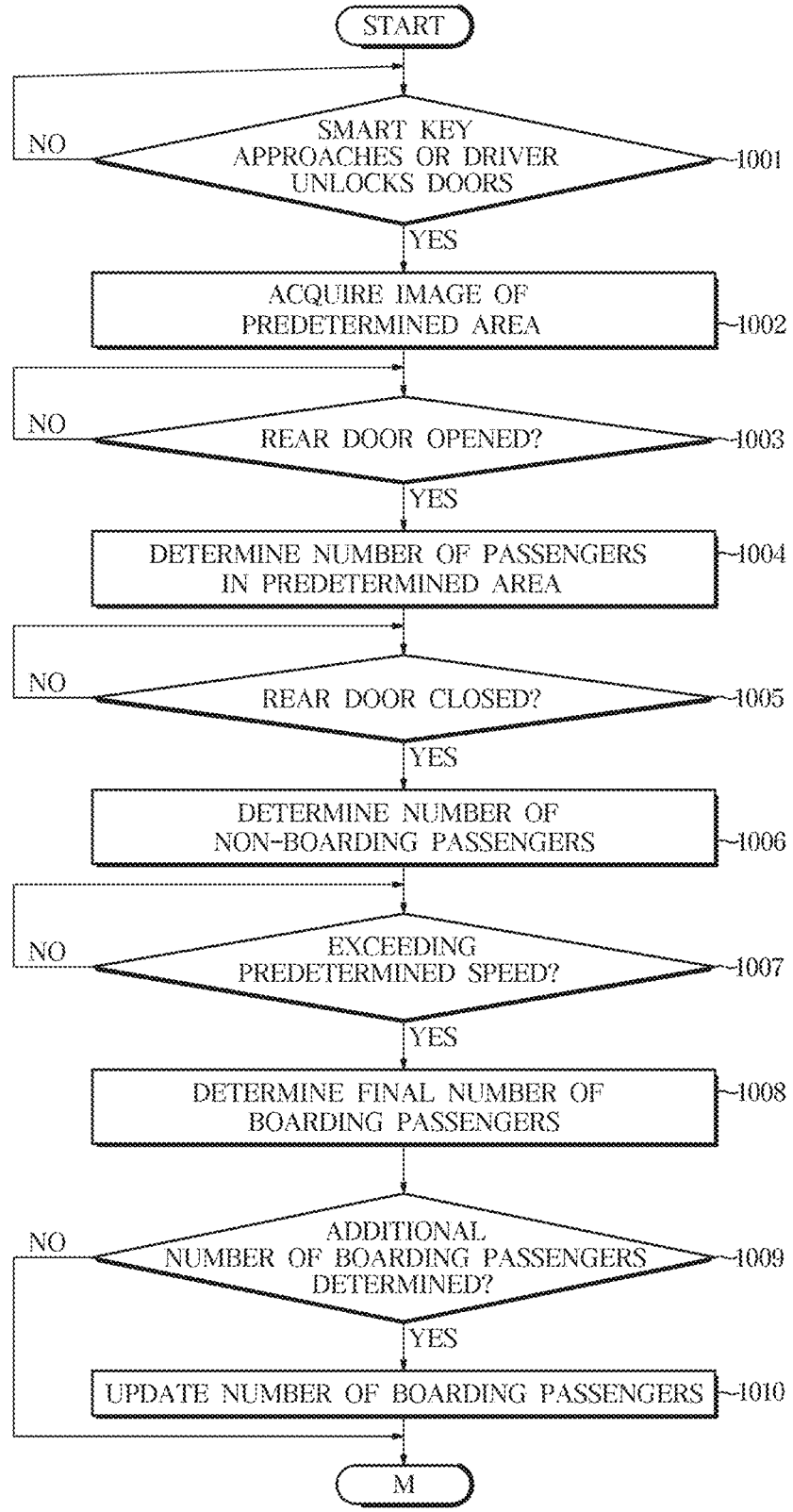
FIG. 8 to FIG. 10 are flowcharts illustrating a vehicle control method according to an embodiment of the present disclosure.
Figure 9:
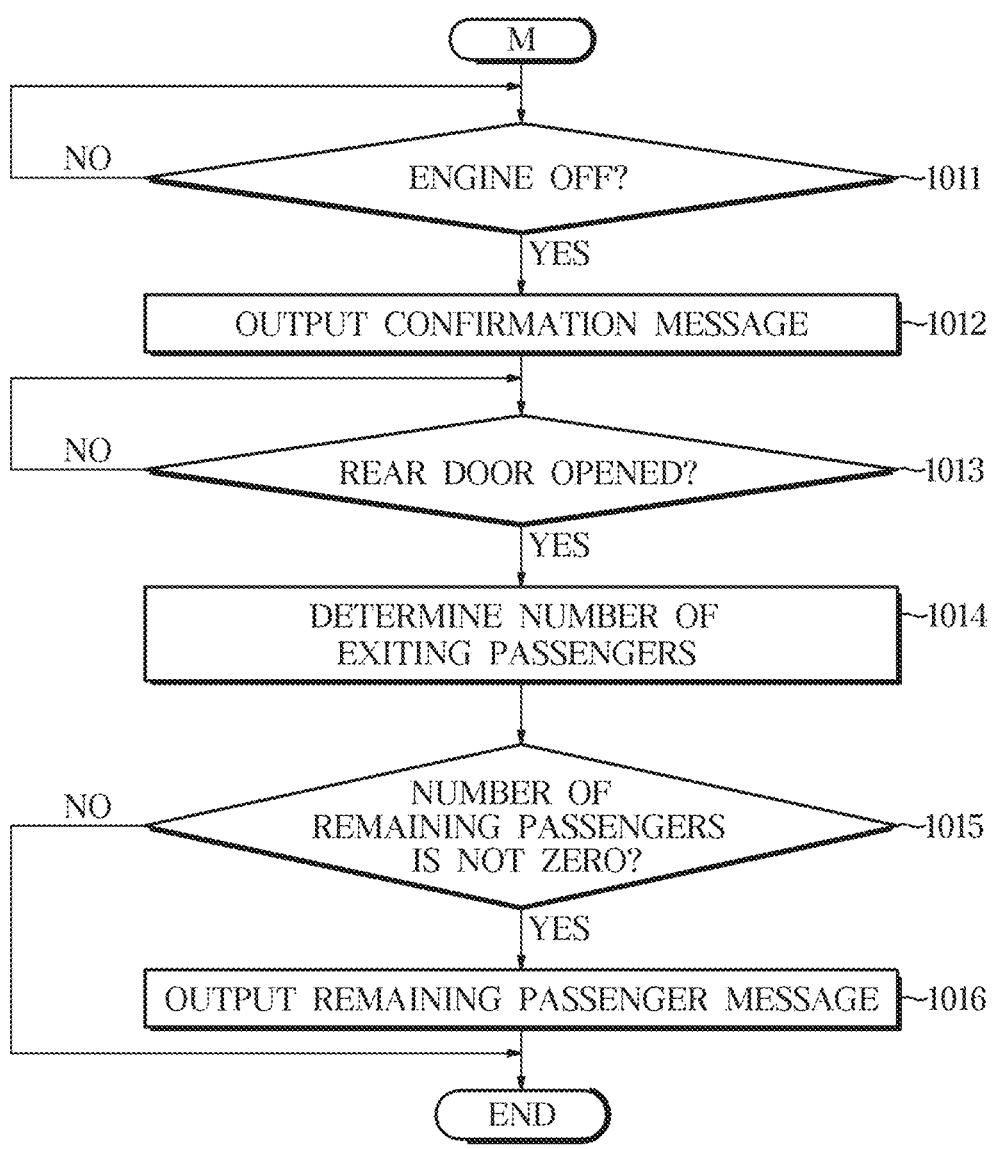
Figure 10:
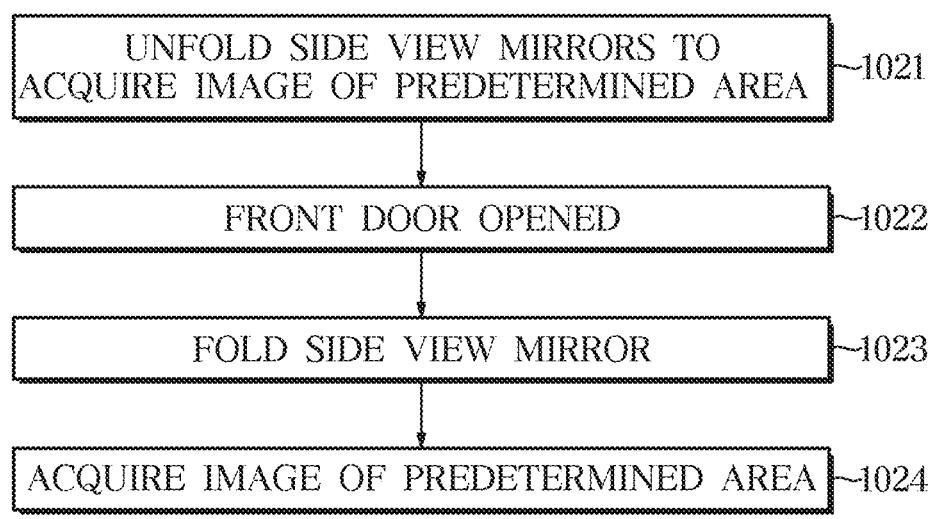

FIG. 8 to FIG. 10 are flowcharts illustrating a vehicle control method according to an embodiment of the present disclosure.

Referring to FIG. 8, in embodiments, when the smart key approaches the vehicle or the driver unlocks the door of the vehicle using the smart key (1001), the image acquisition unit may acquire the image of the predetermined area (1002). When the rear door is opened (1003), the controller may determine the number of the passengers in a predetermined area based on the acquired image (1004). When the rear door is closed (1005) after the opening of the rear door (1003), the controller may determine the number of the non-boarding passengers based on the acquired image (1006). The controller may determine the final number of the boarding passengers based on the difference between the number of the non-boarding passengers and the number of the passengers included in the predetermined area (1008) when a speed of the vehicle exceeds a predetermined speed (1007) after the closing of the rear doors (1005). Further, the controller may update the number of the boarding passengers (1010) based on the image of the predetermined area acquired by the image acquisition unit when the additional number of the boarding passengers is determined (1009).

Referring to FIG. 9, following FIG. 8, when the engine of the vehicle is turned off after driving of the vehicle (1011), the controller may output a confirmation message of whether the boarding passenger exits the vehicle to the output device (1012). When the rear doors are opened (1013), the controller may determine the number of the exiting passengers who exit the vehicle based on the acquired image (1014). The controller may determine the number of the remaining passengers who remain in the vehicle based on a difference between the final number of the boarding passengers and the number of the exiting passengers (1015). The controller may output a remaining passenger message to the output device if it is determined that the final number of the boarding passengers is larger than the number of the exiting passengers so that the number of the remaining passengers is not zero (1016).

Referring to FIG. 10, the controller may unfold the side view mirror to acquire the image of the predetermined area (1021) in between the steps of FIG. 8 and FIG. 9.

The controller may fold the side view mirror (1023) to control the image acquisition unit to acquire the image of predetermined area of the side of the vehicle (1024) when the front doors are opened (1022).

A vehicle and control method thereof according to an embodiment of the present invention can process an image acquired by cameras provided in the vehicle to determine whether or not a passenger is boarding or exiting the vehicle, and can inform a driver of information of remaining passengers.

Embodiments of the present disclosure have been described above. In the embodiments described above, some components may be implemented as a "module." Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described embodiments, embodiments can thus be implemented through computer readable code/instructions in/on a medium, e.g., a computer readable medium, to control at least one processing element to implement any of the above described embodiments. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
   an image acquisition unit configured to acquire images around the vehicle;
   an output device; and
   a controller configured to:
   control the image acquisition unit to acquire at least one image of a predetermined area based on a positional relationship between a smart key and the vehicle, and an opening of at least one rear door of rear doors of the vehicle,
   process the at least one image to determine a number of boarding passengers based on the at least one image of the predetermined area,
   determine a number of passengers included in the at least one image of the predetermined area when the at least one rear door of the rear doors of the vehicle is opened,
   determine a number of non-boarding passengers included in the at least one image of the predetermined area when the rear doors are closed after the opening of the at least one rear door of the rear doors,
   determine the number of the boarding passengers based on a difference between the number of the passengers included in the at least one image of the predetermined area and the number of the non-boarding passengers, and
   output a confirmation message of whether a boarding passenger among the boarding passengers exits the vehicle to the output device when an engine of the vehicle is turned off.

2. The vehicle according to claim 1, wherein:
   the controller is configured to determine a number of exiting passengers who leave from the predetermined area, and output a remaining passenger message to the output device based on a difference between the number of the boarding passengers and the number of the exiting passengers when at least one rear door of the rear doors of the vehicle is opened after the acquiring of the at least one image of the predetermined area.

3. The vehicle according to claim 1, wherein:
   the image acquisition unit is disposed on a side view mirror,
   and the controller is configured to fold the side view mirror corresponding to at least one front door of front doors based on an opening of the at least one front door of the front doors of the vehicle.

4. The vehicle according to claim 3, wherein:
   the controller is configured to unfold the side view mirror based on the positional relationship between the smart key and the vehicle before the opening of the at least one front door to start to acquire the at least one image of the predetermined area.

5. The vehicle according to claim 1, wherein:
   the controller is configured to determine the number of the boarding passengers as a final number of the boarding passengers when a speed of the vehicle exceeds a predetermined speed.

6. The vehicle according to claim 1, wherein:
   the controller is configured to update the number of the boarding passengers based on the at least one image of the predetermined area acquired by the image acquisition unit when an additional number of the boarding passengers is determined before an engine of the vehicle is turned off.

7. A vehicle control method comprising:
   acquiring, by an image acquisition unit, at least one image of a predetermined area based on a positional relationship between a smart key and a vehicle, and an opening of at least one rear door of rear doors of the vehicle;
   processing the at least one image to determine a number of boarding passengers based on the at least one image of the predetermined area,
   wherein:
   the determining of the number of the boarding passengers based on the at least one image of the predetermined area includes,
      determining a number of passengers included in the at least one image of the predetermined area when the at least one rear door of the rear doors of the vehicle is opened,
      determining a number of non-boarding passengers included in the at least one image of the predetermined area when the rear doors are closed after the opening of the at least one rear door, and
      determining the number of the boarding passengers based on a difference between the number of the passengers included in the at least one image of the predetermined area and the number of the non-boarding passengers; and
   outputting, to an output device, a confirmation message of whether a boarding passenger among the boarding passengers exits the vehicle when an engine of the vehicle is turned off.

8. The vehicle control method according to claim 7, further comprising:
   when at least one rear door of the rear doors of the vehicle is opened after the acquiring of the at least one image of the predetermined area,
   determining a number of exiting passengers who leave from the predetermined area, and
   outputting a remaining passenger message to the output device based on a difference between the number of the boarding passengers and the number of the exiting passengers.

9. The vehicle control method according to claim 7, further comprising:
   folding a side view mirror corresponding to at least one front door of front doors based on an opening of the at least one front door of the front doors of the vehicle.

10. The vehicle control method according to claim 9, wherein:
    the acquiring, by an image acquisition unit, of the at least one image of the predetermined area includes:
    starting to acquire the at least one image of the predetermined area by unfolding the side view mirror based on the positional relationship between the smart key and the vehicle before the opening of the at least one front door.

11. The vehicle control method according to claim 7, wherein:
   the determining of the number of the boarding passengers based on the at least one image of the predetermined area includes:
      determining the number of the boarding passengers as a final number of the boarding passengers when a speed of the vehicle exceeds a predetermined speed.

12. The vehicle control method according to claim 7, further comprising:
   updating the number of the boarding passengers based on the at least one image of the predetermined area acquired by the image acquisition unit when an additional number of the boarding passengers is determined before an engine of the vehicle is turned off.

* * * * *